United States Patent [19]

Mellon

[11] 4,124,781
[45] Nov. 7, 1978

[54] TELEPHONE TOLL RESTRICTOR

[75] Inventor: Regis B. Mellon, St. Petersburg, Fla.

[73] Assignee: Akzona Incorporated, Asheville, N.C.

[21] Appl. No.: 829,557

[22] Filed: Aug. 31, 1977

[51] Int. Cl.² ............................................. H04M 1/66
[52] U.S. Cl. ............................. 179/90 D; 179/189 D; 179/18 DA
[58] Field of Search .......... 179/90 D, 189 D, 18 DA, 179/18 FA

[56] References Cited

U.S. PATENT DOCUMENTS

| 3,727,007 | 4/1973 | Catlin | 179/18 DA |
| 3,749,847 | 7/1973 | Piacente et al. | 179/18 DA |
| 3,851,109 | 11/1974 | Downs et al. | 179/90 D |
| 3,872,260 | 3/1975 | Oatis | 179/90 D |
| 3,899,640 | 8/1975 | Piacente | 179/18 DA |
| 3,980,836 | 9/1976 | Chan et al. | 179/18 DA |
| 4,012,602 | 3/1977 | Jackson | 179/90 D |

Primary Examiner—Kathleen H. Claffy
Assistant Examiner—Gerald L. Brigance
Attorney, Agent, or Firm—David M. Carter; Francis W. Young

[57] ABSTRACT

An improved telephone toll restrictor utilizing both current and voltage sensors having substantially infinite input impedance during the on-hook condition. A timing circuit is provided to restrict calls a predetermined time after a digit is dialed but prior to central office timeout. Furthermore, a pulse generator provides a strobe pulse to a coincidence gate which also responds to a digit pulse counter, for avoiding restriction of a digit which should not be restricted.

7 Claims, 1 Drawing Figure

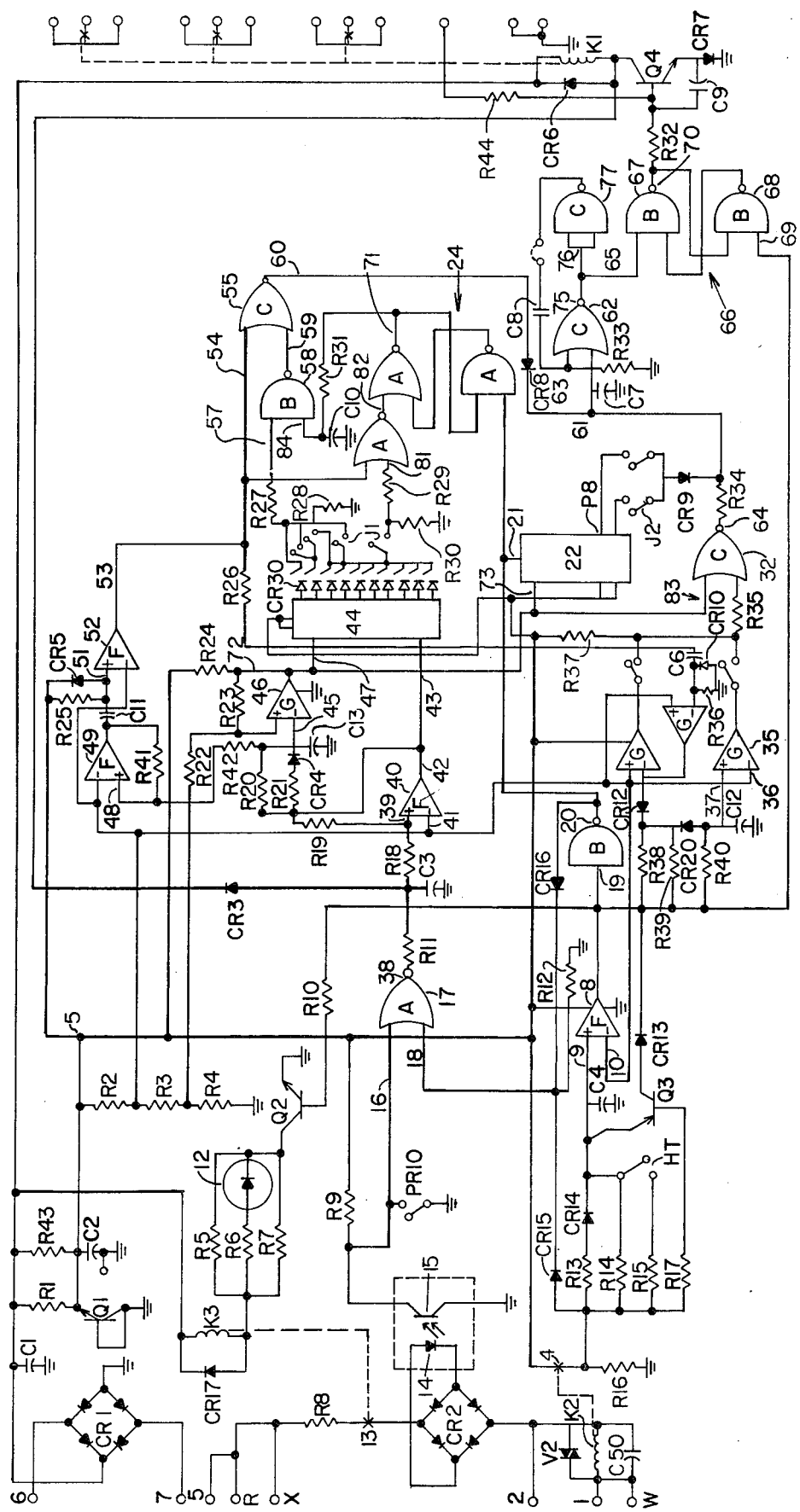

TELEPHONE TOLL RESTRICTOR

BACKGROUND OF THE INVENTION

This invention relates to an improved toll restrictor. More particularly, it relates to a toll restrictor having infinite input impedance during on-hook conditions and utilizes circuitry features which prevent the making of long distance calls normally allowed because of central office timeout and further prevent improper restricting as well as providing standard toll restricting functions.

Toll restrictors and call divertors are provided to overcome the problem of the use of telephones for unauthorized long distance calls. These long distance calls, of course, result in tolls charged to that telephone number.

Some of the first toll restrictors merely utilized a switch in series with either the tip or ring conductor of a telephone. The switch could be placed in a lockbox with only authorized personnel having the key to the box. Of course, this would not permit even local calls when the switch was open. More sophisticated electronic toll restrictors have also been provided. One example of such a restrictor is shown in U.S. Pat. No. 3,757,055. This patent shows a means of restricting an outgoing call if the digit zero is dialed on any of the first three dial pulls, as well as a means for restricting the call if more than eight digits are dialed. However, various techniques have been devised to defeat this type as well as other prior art electronic toll restrictors. For example, the subscriber may dial a digit and wait until the central office times out the call which, in effect, restores the dial tone. The prior art toll restrictor would have sensed this digit and treated it as the digit of the first pull. By using this slow dialing technique, a zero may be dialed, say on the fourth pull, which is normally not restricted. The toll restrictor would see it as the fourth pull, however, the central office would see it as a first dial pull and give access to the operator, thus defeating the toll restrictor.

Also, there have been problems in digit counters giving false indications of a digit to be restricted. For example, if the digit three is to be restricted and the number four is dialed, some counters will provide an output pulse as the counter passes the three count en route to four, thus causing a false indication of restriction.

Prior art toll restrictors and other devices which sense telephone signals are normally attached in parallel to the telephone line, i.e., across the tip and ring conductors. These devices have a finite input impedance. It has been alleged that these can cause problems in the transmission characteristic in the communication lines, such as wave reflections and other distortions.

It is, therefore, desirable to provide a toll restrictor which overcomes these and other problems of prior art.

In the use of the term "restrictor", normally one thinks of disconnecting the telephone handset from the central office by a switch when a call is to be restricted. However, the device set forth herein may also be used to divert outgoing calls from the handset to some prerecorded message, so as to indicate to the caller that he is trying to make a restricted call, or to some other diversion. Furthermore, the restrictor may shunt or open the line or provide other mechanisms for prohibiting the transmission of an unauthorized long distance call. Therefore, the term restrictor should be interpreted in its broadest sense, which would at least include all of the above.

OBJECTS OF THE INVENTION

It is one object of this invention to provide an improved toll restrictor circuit.

It is another object of this invention to provide an electrical circuit adapted to be connected in parallel with the telephone line having substantially infinite input impedance during the on-hook condition.

It is another object of this invention to provide an improved toll restrictor having a circuit means to prevent unauthorized calls by automatically restricting calls a predetermined time after dial pull, but before the central office timeout.

It is another object of this invention to provide an improved toll restrictor having circuit means to prevent the restriction of an allowable digit.

SUMMARY OF THE INVENTION

In accordance with one form of this invention, there is provided a circuit adapted to be connected to the conductors of a telephone line. A current sensing means connected in a series of one of the conductors. Voltage sensing means is adapted to be connected across the conductor. Switch means is connected between said voltage sensing means and one of the conductors. The circuit means responsive to said connect sensing means for opening the switch during a first condition and closing the switch during a second condition for providing substantially infinite input impedance to the circuit during the first condition.

According to another form of this invention, there is provided a telephone toll restrictor circuit including means for sensing dial pulses connected to a telephone line. A dial pull counter is responsive to the sensing means. Timing means are further responsive to said sensing means. The circuit further provides means to restrict outgoing telephone calls. A restriction occurs after a predetermined time from the initiation of said timing means which is less than the timeout cycle of the particular telephone central office.

In accordance with another form of this invention, there is provided a telephone toll restrictor circuit including telephone digit pulse sensing means adapted to be connected to the telephone line. A digit pulse counter is connected to said pulse sensing means. Pulse generating means is connected to the sensing means for generating a pulse after the telephone digit has been dialed. A coincidence gate is connected to the pulse generating means and to the output of the pulse counter for applying a signal to a telephone restrictor upon simultaneous reception of signals from the pulse generating means and the counter to prevent incorrect restriction.

BRIEF DESCRIPTION OF THE DRAWINGS

Subject matter which is regarded as the invention is set forth in the appended claims. The invention itself, however, together with further objects and advantages will be better understood by reference to the following drawing.

The FIGURE is a schematic circuit diagram of one embodiment of the subject invention.

DESCRIPTION OF THE PREFERRED EMBODIMENTS

Referring now to the FIGURE, current sensing relay coil K2 is connected in series with a telephone instrument tip terminal 1, and central office tip terminal 2. Relay contacts 3 are further in series with the telephone instrument tip terminal and relay coil K2 for opening the tip line during the restriction of an unauthorized telephone call. Operation of this set of relay contacts will be explained later. Relay coil K2 is magnetically coupled to its relay contacts 4. Relay contacts 4 are connected in series between resistor R16, which is grounded, and node 5, which is connected to the B+ power supply. Power is supplied for the toll restrictor at AC power input terminals 6 and 7, which may be standard 60 cycle 24 volt power. Full wave rectifier CR1 is connected across terminals 6 and 7 for rectifying an AC power. Capacitor C1 is connected to one side of full wave rectifier CR1, to filter the rectified power from the bridge and provide a smooth filtered DC supply. The collector and emitter of transistor Q1 is connected in series with resistor R1 and this series circuit is connected across capacitor C1. The base of transistor Q1 is connected to its collector, thus, Q1 acts as a zener diode for providing a constant voltage drop of 8 volts across Q1. Capacitor C2 is connected across the emitter-base junction of transistor Q1 for further filtering the voltage. B+ voltage is thus established at node 5. Resistors R2, R3, and R4 act as voltage dividers and are connected in series and across the emitter-base junction of transistor Q1 for providing reference voltages for some of the other circuit components.

Varistor V2 is connected across relay coil K2 for maintaining longitudinal balance to reduce noise.

The junction between relay contacts 4 and resistor R16 is connected to one side of resistors R13, R14, R15, and R17, as well as to the anode of diode CR15. Capacitor C4 is connected to the cathode of diode CR14, and acts as a part of a timing circuit. Capacitor C4 is further connected to the emitter of transistor Q3. Transistor Q3 acts as a discharge path for timing capacitor C4 and is turned on normally by ringing signals through resistor R17 which is connected to its base. Comparator 8 has one input terminal 9 connected to capacitor C4. The reference input terminal 10 is connected to resistor R1, which is in the power supply section. Comparator 8 acts as a threshold detector for capacitor C4. The output terminal 11 of comparator 8 is connected to resistor R10. Resistor R10 is further connected to the base of transistor Q2.

Transistor Q2 acts as a switch to turn on the voltage detecting circuitry. The collector of transistor Q2 is connected to the parallel network including resistor R5, a series combination of resistor R6 and LED12, and resistor R7. The other side of this parallel resistive network is connected to relay coil K3. Relay coil K3 is also connected to resistor R43 in the power supply section. Diode CR17 is connected across relay coil K3. Relay coil K3 is magnetically coupled to relay contacts 13. Relay contacts 13 are connected to resistor R8, which is further connected, in this embodiment, to the telephone ring conductor. The other side of relay contacts 13 is connected to full-wave rectifier bridge CR2, which is further connected to the central office tip terminal 2. Light-emitting diode 14 is connected across bridge CR2 for sensing voltage across the tip and ring conductors when relay contacts 13 are closed. The light-emitting diode 14 is optically coupled to light-responsive transistor 15. The combination of the light-emitting diode and light-responsive transistor is called an optical coupler and is used here for electrical isolation. The collector of light-response transistor 15 is connected to resistor R9, which is further connected to B+ power supply at node 5. The collector of light-emitting diode 15 is also connected to input terminal 16 of NOR gate 17. The other input terminal 18 of NOR 17 is connected to the cathode of diode CR15 and to resistor R12 which is further connected to ground.

Referring again to the current-sensing portion of the circuit, output 11 of comparator 8 is connected to the input of inverter 19. The output 20 of inverter 19 is connected to diode CR16, which is further connected to the input 18 of NOR gate 17. Output 20 of inverter 19 also connected to the reset input 21 of dial pull counter 22 and also to the reset input 23 of latch 24. The output terminal 11 of comparator 8 is also connected to one side of resistors R38, R39, R40. Resistor R38 is connected to the cathode of diode CR12. The anode of diode CR12 is connected to the input terminal 25 of comparator 26, as well as the output terminal 27 of comparator 28. Input terminals 29 and 30 of comparators 26 and 28, respectively, act as reference inputs and are connected to resistor R2 for their reference voltage. The output 29 of comparator 26 is connected to resistor R35, which is further connected to input 31 of NOR gate 32. Differential capacitor C6 is connected to the input terminal 33 of comparator 28 and also is connected to the parallel circuit including resistor R36 and diode CR10. Input 31 of NOR gate 32 is also connected to the output 34 of comparator 35. Input 36 of comparator 35 is connected to a reference voltage at resistor R2. Input 37 is connected to capacitor C12, which is further connected to ground.

Referring now again to the voltage detector portion of the circuit, output terminal 38 of NOR gate 17 is connected to capacitor C3, diode CR3, and resistor R18. Resistor R18 is connected to input terminal 39 of comparator 40. Input terminal 41 of comparator 40 is connected to reference voltage resistor R2. Resistor R18 is also connected to resistor R19, which is further connected between the input terminal 39 and output terminal 42 of comparator 40.

Output 42 is connected to the input terminal 43 of dial pulse counter 44. Pulse counter 44 has ten output terminals which correspond to a digit which may be programmed to be restricted. The programming means includes dip switch 56 which are connected to output of the pulse counter through a plurality of diodes and a dip switch. The digit to be restricted corresponds to a closed dip switch.

Output 42 of comparator 40 is also connected to resistors R20 and R21. Resistor R21 is connected to diode CR4, which is further connected to capacitor C13. Capacitor C13 is connected to input terminal 45 of comparator 46. The output of comparator 46 is connected to reset input 47 of pulse counter 44. Capacitor C13 and resistor R20 are also connected to resistor R42, which is further connected to input terminal 48 of comparator 49. The output 50 of comparator 49 is connected to differential capacitor C11. Differential capacitor C11 is further connected to input terminal 51 of comparator 52. Comparator 52 acts as pulse generator for providing a negative strobe pulse at output 53 so that there will not be restriction of a digit which should not be restricted. This feature will be explained in more detail in the discussion of circuit operation.

Furthermore, this strobe pulse acts to reset an interdigital timer by its connection to resistor R26, back to differential capacitor C6. Again, this feature will be explained in the discussion of circuit operation.

Output 53 of comparator 52 is also connected to input 54 of NOR gate 55. The output terminals from the dip switches 6 which are closed are connected to resistor R27, which is further connected to gate input 57 of nand gate 58. The output 59 of nand gate 58 is also connected to the input of logic gate 55. Logic gate 55 acts as a coincidence gate such that there must be a simultaneous occurrence of pulses on each input 54 and 59 in order to provide an output pulse at 60. Gate 55 may be a nand gate.

Output 60 of nand gate 55 is connected to diode CR8 which in turn is connected to the input terminal 61 of nor gate 62. The other input terminal 63 is connected to resistor R33. Input terminal 61 is also connected to resistor 34, which is further connected to the output terminal 64 of nor gate 32. Input terminal 61 of nor gate 62 is also connected to diode CR9. Diode CR9 is further connected to the outputs of dial pull counter 22, which provides pulses upon dialing a predetermined number of pulls on the telephone which are to be restricted. In this embodiment, the eighth pull is to be restricted. Therefore, NOR gate 62 acts to gate through all restrict signals, including the output signal of the digit rank or pulse counter 44, the output of the dial pull counter 22, and the offhook interdigital timer which will be explained later.

Nor gate 62 is connected to the input terminal 65 of flip-flop 66. Flip-flop 66 includes cross-coupled NOR gates 67 and 68, which operates as a latch. Another input terminal 69 is connected back to the output of comparator 8 which acts as a reset for the flip-flop. Output terminal 70 of flip-flop 66 is connected through resistor R32 to transistor Q4. Capacitor C9 is connected across the base emitter junction of transistor Q4 to prevent false triggering and diode CR7 is connected between the emitter of transistor Q4 and ground. The collector of transistor Q4 is connected to relay coil K1. Relay coil K1 is magnetically coupled to relay contacts 3, which is connected in a series with the telephone tip conductor, and acts to open circuit or restrict telephone calls which are programmed to be restricted. Diode CR6 is connected across coil K1 to provide transient protection.

The circuit operates in the following manner:

PHONE ON HOOK

In the idle condition, when the phone is onhook, relay coils K1, K2, and K3 are deenergized and transistors Q2, Q3, and Q4 are nonconducting. Since in the onhook condition, zero DC current is flowing through coil K2, relay contacts 4 are open, thus, there is no B+ supplied to the input terminal 9 of comparator 8. Therefore, terminal 9 of comparator 8, is at ground. Since terminal 9 is at ground, output terminal 11 of comparator 8 is also at ground, as well as input terminal of inverter 19. The output terminal 20 of gate 19 is at a logic level 1. Also, logic level 1 at reset terminal 21 of pull counter 22 as well as the reset input terminal 23 of flip-flop 24. The pull counter 22 is a Johnson Decade counter. Output terminal 71 of flip-flop 24 is, therefore, logic level 1. So long as the output terminal 11 of comparator 8 is at logic level zero, the transistor Q2 is turned off, therefore, current does not flow through relay coil K3, thus, relay contacts 13 remain open. Since relay contacts 13 are across the tip and ring conductors, the tip and ring conductors and thus the central office would "see" infinite input impedance to a sensing portion of the circuitry as well as the remainder of the toll restrictor while the contacts 13 are open. In this way, there is no possibility that telephone central office equipment may be damaged nor can the transmission of telephone conversations and signals be affected due to the fact that this device is across the telephone lines. In fact, the only time that the toll restrictor exhibits input impedance is during the phone offhook condition.

PHONE OFFHOOK

When telephone instrument comes offhook, D.C. current flows through relay coil K2, which is also in series with the phone instrument. Contacts 4 are closed, thus allowing capacitor C4 to begin charging from the power supply at node 5 through resister R13 and diode CR14. When the charge on capacitor C4 reaches the reference voltage on input terminal 10 of comparator 8, the output terminal 11 changes to a logic level 1. Logic level 1 forward biases the emitter-base junction of transistor Q2 causing collector current to flow through LED12 and resistors R5, R6, and R7, as well as through relay coil K3. Relay coil K3 thus energizes and closes contacts 13, causing the voltage sensor or the optical coupler including optical diode 14 and optical transistor 15 to be placed across the telephone line. The input impedance of the toll restrictor is no longer infinite. As the LED comes on, transistor 15, which had previously been conducting, goes to its nonconducting state; therefore, input terminal 16 of logic gate 17 becomes positive. The logic level on output terminal 20 of inverter 19 becomes negative when the output on comparator 11 becomes positive, thus removing the reset from terminals 21 of pull counter 22 and terminal 23 of flip-flop 24. The toll restrictor is thus powered up and ready to begin counting digit pulses and dial pulls.

DIAL PULL COUNTING AND IDENTIFICATION

While the circuit described is particularly adapted for use with a rotary-type telephone instrument, it may also be used as a Touch-Tone type instrument by providing a Touch-Tone to digital convertor (not shown) across the optical coupler. The circuit, however, will be described for use with a rotary-type telephone instrument, but as such, is not limited to rotary.

When a digit is dialed on a rotary-type telephone instrument, a number of breaks occur in the D.C.-output current corresponding to a value of the digit dialed. A dial break results in the loss of loop current in the presence of full central office battery voltage appears across the line. Consequently, for each line break, relay coil K2 deenergizes, thus opening relay contacts 4. Break time on the dial pulse is normally about 60 milliseconds. During each dial break, capacitor C4 begins to discharge through resistors R14 and 15 and through R16 to ground. As capacitor C4 discharges, input terminal 9 of comparator 8 approaches the reference voltage of terminal 10. However, capacitor C4 requires 300 milliseconds to obtain such reference voltage when jumper HL is switched on. Since this time is greater than the 60 millisecond dial pulse time, output terminal 11 remains at logic level 1 allowing current to continue to flow through relay coil K3, thus keeping the relay contacts 13 closed and the voltage sensor connected across the line. The junction between CR15 and R16, however, will become logic level zero since B+ is no longer available at that point. Diode CR15 will no longer be forward biased. Input terminal 18 of nor gate 17 becomes logic zero. Since transistor 15 is on, input terminal 16 is logic level zero and the output 38 of gate 17 becomes logic level 1, charging capacitor C3. When the voltage at the input terminal 39 of comparator 40 exceeds its reference level on 41, output terminal 42 becomes logic level 1. Logic level 1 is fed back to input terminal 39 to obtain a fast switching transition. A logic level 1 is applied at input terminal 45 of comparator 46. Output terminal 72 becomes negative with the application of logic level 1 at the input terminal 45, which causes a negative at the reset input terminal 47 of digit pulse counter 44, as well as the terminal 73 of dial pull counter 22. Resistors R23 and R22 provide a fast rise and fall edges during the transition time of output terminal 72. The zero state at pulse counter reset 47 enables the digit pulse counter to commence counting on the trailing edge of the dial pulse. As a result of the negative transition on input terminal 73, due to the logic zero transition of output 72, of pull counter 22 advances by one court, and capacitor C11 discharges through diode CR5 to the logic 1 state. The input terminal 48 of comparator 49 becomes logic 1, resulting in a logic 1 at output terminal 50. This logic 1 discharges capacitor C11 through diode CR5. Upon the completion of dial break, current again energizes relay coil K2, and thus closes the contacts 4. The absence of voltage across the phone line causes transistor 15 to stop conducting, placing logic level 1 at input terminal 16 of nor gate 17. Output terminal 38 returns to logic zero, discharging capacitor C3 and allowing output terminal 39 of comparator 40 to become logic zero. Output terminal 42 also becomes logic zero. The transition to logic zero through output 42 of comparator 40 causes counter 44 to advance one count.

Logic level zero at output terminal 42 resulting from the dial switch closure starts capacitor C13 to discharge through resistor R20. It requires C11 150 milliseconds to discharge to the voltage level where terminal 48 of comparator 49 becomes less than the reference supply. If a digit being dialed is still pulsing, the next dial break will occur before capacitor C11 has an opportunity to discharge to this reference level. Consequently, C11 will never discharge until the completion of the next dial pull. However, after the last pulse, terminal 48 drops below the reference level, resulting in output terminal 50 becoming logic level zero. The negative transition of the output is differentiated by capacitor 11 causing logic level zero state at the input terminal 51 of comparator 52. Logic level zero input terminal 51 will persist until resistor R25 charges capacitor C11 past the reference voltage applied at the reference terminal of comparator 52, which is 10 milliseconds, in this embodiment. Therefore, the comparator 52 will pulse logic zero, output terminal 53 for 10 milliseconds. The so-called strobe occurs before reset has occurred on terminal 47 of counter 44.

RESTRICT CYCLE

Any call which is a candidate for restriction is indicated by momentary logic level 1 at the input terminal 61 of nor gate 62. A logic 0 is provided at output terminal 75, input terminals 76 of inverter 77, and input terminal 65 of R-S latch 66. Output terminal 70 R-S latch 66 then goes to a logic level 1 state and emitter-base current flows in transistor Q4 through resistor 32. Transistor Q4 saturates energizing relay coil K1 which opens contacts 3 which is in series with the tip line. The telephone instrument is disconnected from the central office so long as coil K1 remains energized. In this embodiment, coil K1 remains energized for 1.6 seconds which is sufficient time to drop and reset all switching equipment in most central offices so that when reconnection is established at the end of 1.6 seconds, a new request for service is detected by the central office and a dial tone is re-established. The 1.6 seconds time constant is established by capacitor C8 and resistor R33.

Logic level zero at input terminal 76 of inverter 77 causes logic level 1 at the output terminal 78. This logic level 1 transition is differentiated by capacitor C8, which causes logic level 1 at input terminal 63 of nor gate 62. For output terminal of nor gate 62 and input terminal 65 of latch 66 to maintain the logic zero state, it is necessary to maintain relay coil energized regardless of the condition of the terminal 61 or nor gate 62. Resistor 33 begins to charge capacitor C8, causing terminal 63 of nor gate 62 to return to the logic 0 state in 1.6 seconds. When input terminal 63 becomes logic zero, output terminal 75 and input terminal 65 of flip-flop 66 are logic level 1, which causes the latch to change state, providing that input terminal 69 of latch 66 has returned to the logic 1 state, thus turning off the transistor Q4 and deenergizing relay K1, thereby closing contacts 3.

RANK RESTRICTION

As explained previously, counter 44 identifies the value of the digits dialed and maintains the information for 250 milliseconds after completing the dial pull. The digit is identified by logic level 1 state at one of the 10 outputs of the counter. For example, if the digit 4 had been dialed in the first dial pull, output terminal 4 will become a logic level 1 and remain in this state for 250 milliseconds after completing the dial pull. It is assumed that digit 4 is to be restricted if dialed on the first pull. Output terminal 4 becomes logic 1 and, therefore, the associated output diode becomes forward biased. Current travels through jumper bridge J1 and through resistor R28. The junction of resistor R28 and resistor R27 becomes logic level 1 allowing input terminal 57 of nand gate 58 to become logic level 1 causing zero logic level at output terminal 59. This zero level is applied to input terminal 80 of nand gate 55. As stated previously, a 10 millisecond negative strobe output from comparator 52 on output 53 is at logic level zero 50 milliseconds after completing the dial pull. This 10 millisecond strobe pulse is applied to input terminal 54 of nand gate 55. Output terminal 60 of nand gate 55 will become a logic level 1 upon the coincidence of these two negative input pulses. As a result CR8 is forward biased and applies a positive pulse gate 62 at input terminal 61 or nor gate 62, causing a restrict cycle as previously explained. Thus, by use of coincidence gate 55 and the strobe pulse from output terminal 53, there is provided assurance that only digits from counter 44 which are programmed to be restricted will be restricted. For example, if the digit 4 is to be restricted and digit 5 is dialed, an output pulse will appear on the first five output terminals as the pulses are counted in the pulse counter 44. Thus, even though the digit five is pulled, a pulse will appear at the output of terminal 4 of the counter. However, since the strobe does not occur until the end of the dial train, there will be no coincidence of the pulse on the output terminal 4 of counter 44 and the strobe output of pulse generator 52 so that restrict cycle will not occur.

This negative strobe on output terminal 53 is also connected to input terminal 79 of nor gate 80. Input terminal 81 of nand gate 80 is grounded at level zero. Output terminal 81 of nand gate 80 is, therefore, logic 1. Input terminal 83 of latch 24 is, therefore, level 1. Therefore, output terminal 71 becomes logic zero for the duration of the offhook condition. Logic zero on output terminal 71 is coupled to input terminal 84 of nand 58. Therefore, a signal will not pass to the output of nand gate 58 from pulse counter 44 because of the zero on input terminal 84, effectively disabling the pulse counter 44.

DIAL PULL COUNTER AND RESTRICTION

As explained earlier, the dial pull counter is counter 22. In order to limit the number of dial pulls, the connector J2 must be programmed appropriately. If it is desirable to restrict on eight dial pulls, connector J2 must be connected to output P8. The counter 22 advances on the leading edge of every dial pull. At the beginning of the eight dial pull, the output terminal 9 of counter 22 will obtain logic 1; therefore, diode CR9 will become forward biased causing output terminal 61 or nor gate 62 to become the logic 1 state. The restrict cycle will occur as previously described when the input of this nand gate 62 becomes positive.

DIALING TOO SOON AFTER ONHOOK

When a telephone instrument is onhook, the output of comparator 8 is at logic zero maintaining capacitor C12 in discharged state. Input 37 of comparator 35 is also zero. Input 31 of nor gate 32 will also remain zero until C12 charges. Removing the phone instrument from onhook starts the charging of capacitor C12 through resistor R40. The time required for C12 to charge above the reference level of 36 is one second. Should dialing occur before C12 charges to logic 1, a logic zero will exist at input terminal 83 of nor gate 32 generated output 72 of comparator 46 going from one to logic zero from the leading edge of the first dial break. Consequently, the output of nor gate 32 will be logic 1. This places a logic level 1 at the input 61 of nor gate causing restriction which prevents fast dialing immediately after the pickup which has defeated some toll restrictors in the past.

INTER-DIGITAL TIMING

As previously discussed, the output level of comparator 8 is logic state zero when phone is onhook. Removing the phone from onhook causes the output 11 of comparator 8 to become a one; therefore, capacitor C5 starts charging to a logic 1 through resistor R39. When capacitor C5 has the opportunity to charge to the voltage level equal to the reference voltage level applied to input terminal 24 of comparator 26, output 29 becomes logic zero. Therefore, input terminal 31 of nor gate 32 is also zero. As previously described on the leading edge of the dial pull, terminal 83 of nor gate 32 becomes logic zero. Therefore, output terminal 64 will become logic one along with input terminal 61 of nor gate 62. Therefore, a restrict cycle will occur. The time required for capacitor C5 to charge is approximately 13 seconds. Therefore, dialing must occur before the 13 seconds time out cycle of capacitor C5 or a restrict cycle shall follow. For purpose of illustration, assume that capacitor C5 has started its charging cycle but has not yet charged to the reference level of comparator 26. Also, assume that dial break occurs in this time period. The leading edge of the dial pull will cause the terminal 53 from strobe output or pulse generator 52 to become logic zero; however, since capacitor C5 has not had the opportunity to fully charge, the terminal 31 is at logic 1, the output 64 will remain at zero, and the pull will not be restricted. Also, 150 milliseconds after the dial pull comparator 52 generates a negative strobe on its output 53 for a period of 10 milliseconds.

The trailing edge of the negative strobe is differentiated by capacitor C6 causing the terminal 33 of comparator 28 to be logic zero and its output 27 to be logic zero. Therefore, capacitor C5 is discharged to logic zero by way of output terminal 27 of comparator 28. As a result, capacitor C5 starts its time out period over again following every dial pull.

Since the time out cycle of the central office is normally greater than 13 seconds, the toll restrictor cannot be fooled by merely lifting the phone offhook and dialing a number and leaving the phone offhook for over 13 seconds before dialing a second dial pull. The central office would have normally seen a zero on the first dial pull, thus giving operator access while the toll restrictor would have seen zero on the second dial pull, which normally would not be restricted, except for this inter-digital circuitry.

DIGITAL TIMING CIRCUITRY HANG UP

After completion of a call and the telephone instrument is returned to onhook state, coil K2 deenergizes and starts the discharge of capacitor C4 through resistors R14, R15, and R16. The time required for C4 to discharge below the threshhold reference of comparator 8 is approximately 300 milliseconds. This time constitutes the onhook timeout period. When C4 is discharged at the point below the reference of comparator 8, the output 11 of comparator 8 turns to logic zero. The transistor Q2 thus drops out of saturation deenergizing relay K3, opening relay contacts 13, thus again providing infinite input impedance to the toll restrictor as seen from the telephone line. With output 11 of comparator 8 at logic zero, all the latches and counters return to reset condition as previously described.

RING-IN

Whenever a multiple ringer is placed on the line, the tendency of capacitor C5 to charge is proportional to the number of ringers on the line. The reason C4 starts to charge during ring is because relay coil K2 becomes energized on every half cycle of the ring current. Capacitor C4 has a tendency to integrate to the logic level 1 on every positive and negative peak of the ringing voltage. If this condition remained unchecked, the toll restrictor logic will interpret the ring as an offhook condition and thus breaking the ring would be considered as a hangup. Consequently, the toll restrictor would be going from the onhook to the offhook state, thus closing contacts 13 during ringing. Therefore, the circuit would no longer provide infinite impedance to the line which is undesirable. This condition is prevented by way of transistor Q3. K2 energizes during ringing and starts to charge C4. Thus, C4 after being charged to a voltage equal to approximately 0.7 volts, causing the emitter-base junction of Q3 to be forward biased between ringing voltage peaks. Consequently, transistor Q3 saturates resulting in the removal of the charge on C4. Capacitor C4 discharges through the emitter-collector junction of Q3 and diode CR13 placing the logic "0" at the output 11 of comparator 8. Therefore, capacitor C4 never has the opportunity to become charged to the reference level of comparator 10 which would give a false onhook indication.

The circuit as heretofore described has been built and operated with components having the following values:

| | | |
|---|---|---|
| CR1 | WO4M | Full Wave Bridge Rectifier |
| CR2 | " | " |
| CR14 | IN4148 | Diode |
| CR15 | " | " |
| CR13 | " | " |
| CR20 | " | " |
| CR12 | " | " |
| CR3 | " | " |
| CR4 | " | " |
| CR10 | " | " |
| CR9 | " | " |
| CR16 | " | " |
| CR8 | " | " |
| CR3 | " | " |
| CR30 | " | " |
| CR31 | " | " |
| CR32 | " | " |
| CR33 | " | " |
| CR34 | " | " |
| CR35 | " | " |
| CR36 | " | " |
| CR37 | " | " |
| CR38 | " | " |
| CR7 | IN4004 | Diode |
| CR6 | " | " |
| CR17 | " | " |
| CR5 | IN4004 | Diode |
| 12 | | Light Emitting Diode (LED) |
| V2 | | Varistor (100F) |
| Q1 | | Transistor NPN 2N2222 |
| Q4 | | " |
| Q3 | | Darlington Transistor PND MPSA65 |
| Q2 | | Transistor NPN 2N2222 |
| ICA | | 4001 2-Input Quad Nor Gate C-MOM |
| ICB | | 4011 C-Mo5 2-Input Quad Nand Gate |
| ICC | | 4001 C-Mo5 2-Input Quad Nor Gate |
| 44 | | 4017 C-Mo5 Johnson Decade Counter |
| 22 | | " |
| ICF | | 3403 Quad Op-Amp |
| ICG | | 3302 Quad Comparator |
| R16 | 10K | Ohm Resistor |
| R17 | 1 Meg. Ohm " | All Resistors |
| R15 | 330K Ohm " | are ½ Watt |
| R14 | 330K " | |
| R13 | 47K " | |
| R12 | 100K " | |
| R40 | 1 Meg " | |
| R39 | 1.5 Meg " | |
| R38 | 1 K " | |
| R36 | 470K " | |
| R35 | 100K " | |
| R34 | 100K " | |
| R33 | 220K " | |
| R32 | 10K " | |
| R1 | 1K " | |
| R43 | 1K " | |
| R5 | 2.2K " | |
| R6 | 2.2K " | |
| R7 | 2.2K " | |
| R2 | 10K " | |
| R3 | 4.7K " | |
| R4 | 4.7K " | |
| R9 | 100K " | |
| R10 | 10K " | |
| R11 | 100K " | |
| R18 | 47K " | |
| R19 | 1 Meg " | |
| R22 | 47K " | |
| R20 | 150K " | |
| R21 | 10K " | |
| R23 | 1 Meg " | |
| R41 | 1 Meg " | |
| R24 | 47K " | |
| R25 | 100K " | |
| R30 | 100K " | |
| R29 | 100K " | |
| R28 | 47K " | |
| R27 | 100K " | |
| R8 | 47K " | |

-continued

| | | | |
|---|---|---|---|
| C1 | 47 | Micro Farad Capacitor | |
| C2 | 10 | " | |
| C50 | 65 | " | Non-Polarized |
| C4 | 2.2 | " | |
| C12 | 1 | " | |
| C5 | 10 | Micro Farad Capacitor | |
| C3 | .1 | " | |
| C13 | 1 | " | |
| C11 | 1 | " | |
| C8 | 10 | " | |
| C9 | 10 | " | |
| C6 | 1 | " | |
| Item 14 & 15 | 4N37 Optical Coupler | | |
| K2 | | 1 Form A Reed Relay (Coil = 34 Ohm) | |
| K1 | | 4 Pole Double Throw Cradle Relay | |
| C10 | | 1 Micro Farad Capacitor | |
| R31 | | 100K Ohm Resistor | |

So, it is seen that an infinite impedance toll restrictor (on hook) circuit is set forth which utilized a generated strobe pulse for the dual purpose of providing interdigital timing and assurance of the restriction of only the intended digits.

From the foregoing description of the preferred embodiment of the invention, it will be apparent that many modifications may be made therein. It should be understood, however, that this embodiment of the invention is intended as an exemplification of the invention only and that the invention is not limited thereto. It is to be understood, therefore, that it is intended in the appended claims to cover all such modifications as fall within the true scope of the invention.

What is claimed is:

1. A circuit adapted to be connected to the conductors of a telephone line comprising:
    first and second input terminals adapted to be connected respectively to first and second telephone line conductors;
    voltage sensing means adapted to be connected to said first and second input terminals and thus across the first and second conductors;
    said voltage sensing means including an output means; said output means providing an indication of certain predetermined voltage levels across said first and second input terminals;
    switch means connected between said voltage sensing means and said first input terminal;
    current sensing means connected in series with one of the conductors;
    circuit means responsive to a first condition of said current sensing means for opening said switch means and responsive to a second condition for closing said switch means, whereby said voltage sensing means will exhibit substantially infinite input impedance to said telephone line during said first condition.

2. A telephone toll restrictor circuit comprising:
    first and second input terminals adapted to be respectively connected to first and second telephone line conductors;
    voltage sensing means adapted to be connected to said first and second input terminals and thus across the first and second conductors;
    first switch means connected between said voltage sensing means and said first input terminal;
    current sensing means connected in series with one of the conductors;

first circuit means responsive to a first condition of said current sensing means for opening said first switch means and responsive to a second condition for closing said first switch means;

second circuit means responsive to said voltage sensing means and current sensing means for analyzing outgoing dial pulses on the first and second conductors; said second circuit means having been programmed for analyzing said outgoing dial pulses;

second switch means responsive to predetermined combinations of dial pulses analyzed by said second circuit means, whereby certain outgoing telephone calls may be restricted.

3. A circuit as set forth in claim 2 wherein said first circuit means includes a timing circuit for delaying the operation of said first switch means; said timing circuit being initiated in response to the condition of said current sensing means.

4. A circuit as set forth in claim 3 further including means to prevent closing said first switch during A.C. signalling on the conductor.

5. A circuit as set forth in claim 2 wherein said second circuit means includes programmable logic circuitry connected to said current and voltage sensing means.

6. A telephone toll restrictor circuit comprising:

first and second input terminals adapted to be connected to first and second telephone leads;

means for sensing dial pulses connected to at least one of said input terminals;

a dial pulse counter responsive to said sensing means;

means to restrict an outgoing telephone call connected to one of said leads;

timing means responsive to said sensing means; said means to restrict responsive to said timing means after a predetermined time;

said predetermined time being less than the time out cycle of a predetermined telephone central office, whereby said means to restrict switches to the restrict mode after the occurrence of said predetermined time so that a restrictable call is not allowed to be made because of central office time out;

means for resetting the timing cycle of said timing means after each dial pull; said means for resetting including a pulse generating means connected to said means for sensing dial pulses and further connected to said timing means; said pulse generating means generating a reset pulse for each dial pull.

7. A telephone toll restrictor circuit comprising:

input means adapted to be connected to telephone line conductors;

telephone digit pulse sensing means connected to said input means;

a digit pulse counter connected to said pulse sensing means;

pulse generating means having an input and an output terminal; said pulse generating means input terminal connected to said sensing means, said pulse generating means providing a first output signal level prior to and during digit signaling from said digit sensing means; said pulse generating means providing a second output level for a predetemined time after signaling from said digit sensing means;

a coincidence gate having first and second input terminals and an output terminal;

said pulse counter connected to said first coincidence gate input terminal, and said output terminal of said pulse generating means connected to said second coincidence gate input terminal wherein a signal occurs on said coincidence gate output terminal upon the simultaneous occurrence of a signal on said coincidence gate first input terminal and said second output level signal on said second coincidence gate input terminal;

means for restricting a telephone call upon the dialing of a predetermined digit, said means for restricting in response to said signal on said coincidence gate output terminal.

* * * * *